United States Patent Office 3,114,597
Patented Dec. 17, 1963

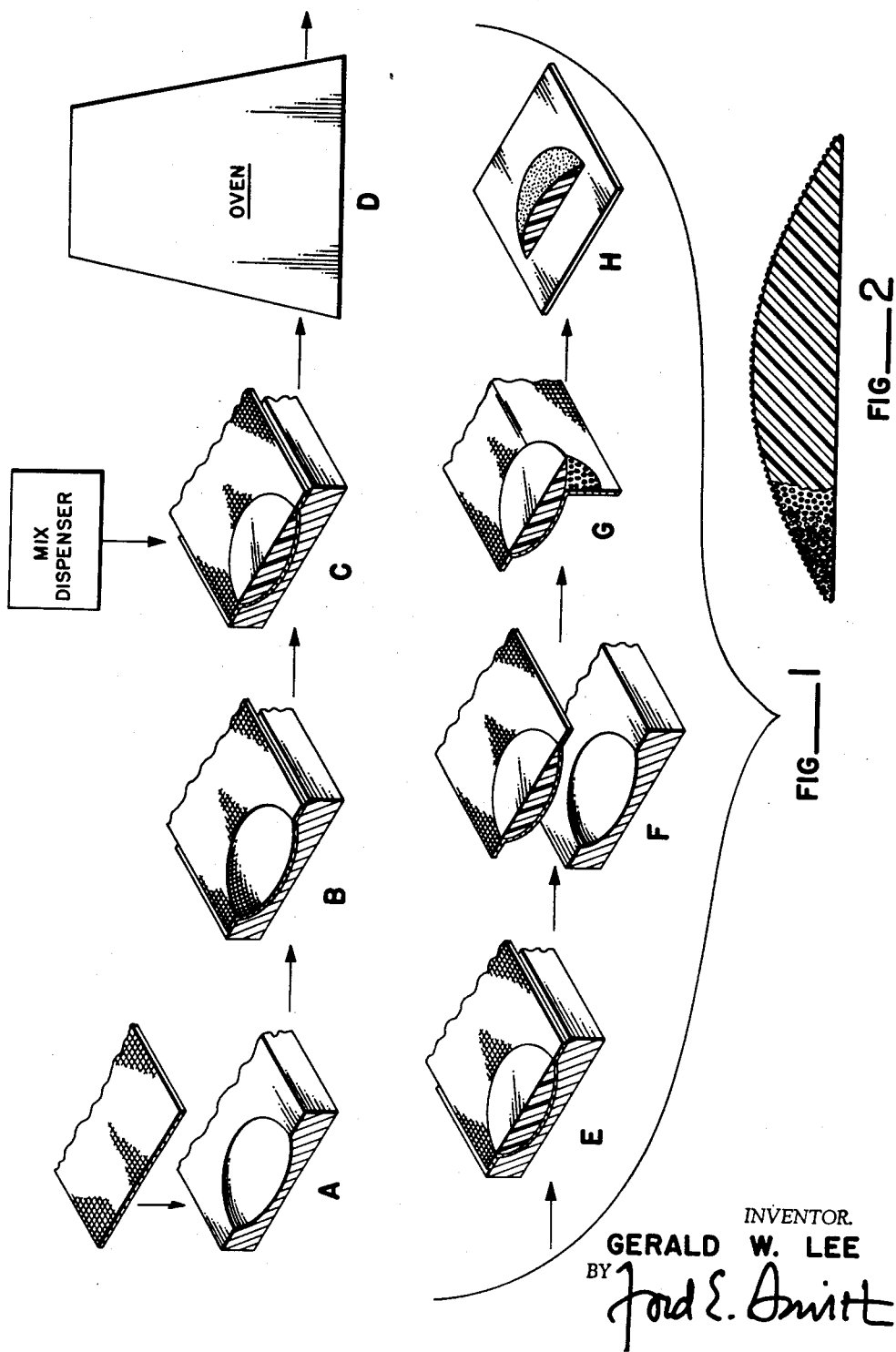

3,114,597
PROCESS FOR MAKING TRAFFIC MARKERS
Gerald W. Lee, Seattle, Wash., assignor, by mesne assignments, to Weyerhaeuser Company, Tacoma 1, Wash., a corporation of Washington
Filed Feb. 2, 1962, Ser. No. 170,693
6 Claims. (Cl. 18—58)

This invention relates to a new and novel concept in a process for mass producing traffic lane buttons or markers. More specifically, this invention relates to a process for making traffic markers containing inherently high reflectance properties and at the same time producing the markers so that their maximum reflecting ability is realized.

Up to the present time, production of road traffic markers or buttons containing a high percentage by weight of spherical glass particles or beads was severely bottlenecked by outmoded methods for exposing the beads on the marker surface. The problem arose from the basic nature of the forming process. When the marker composition was poured into the smooth mold, cured and then removed, it was found that no beads protruded from the surface, but that in fact the beads lay immediately under the smooth matrix surface. Thus it was necessary, after complete forming to add an extra step of abrading the surface mechanically or stripping it with solvent. Either step requires additional equipment, time and labor. Hence, costs per marker remain high.

The markers of this invention are manufactured from a solidifiable plastic (synthetic resin) materal containing, among other constituents, a high percentage by weight of very small spherical glass particles, or beads. The glass particles are dispersed through and mixed with the composition before it is introduced to the molds. The molds themselves are lined with a porous cloth material, such as cheesecloth, before the viscous composition is added. Before the markers are completely cured or hardened the cloth material is stripped off, leaving a surface which contains a maximum of exposed glass particles partially embedded in the body of the marker. Thus a high reflectance value is imparted to the markers.

Accordingly, it is an object of this invention to provide a process for making traffic markers which are extremely durable and therefore may be used for years.

A second object of this invention is to produce a marker which has high qualities of reflectance or luminescence for the entire period of its useful life.

Another object of this invention is to provide a process which allows for fast and economical mass production of a durable and long-life traffic marker.

Still another object is to provide a process for making traffic markers which eliminates time-consuming and expensive treatment to expose an optimum reflecting surface on said traffic markers.

Yet another object of this invention is to provide a process which may be adapted to the production of traffic markers having a wide range of sizes and shapes.

These, together with other objects and advantages which will become subsequently apparent, reside in the step-by-step details of the process and its operation as more fully hereinafter described and claimed, reference being had to the accompanying drawings forming a part hereof, wherein like numerals refer to like parts throughout, and in which:

FIG. 1 is a diagrammatic flow representation of the steps through which each marker must progress in this process; and FIG. 2 is a cross-sectional view of a marker showing diagrammatically that the surface comprises partially exposed beads and the body of the finished product is evenly permeated with small spherical glass particles or beads.

The premix composition from which the road markers are formed consists of a synthetic resin base such as polyester resin with a styrene monomer cross-linking agent. To the resin base and cross-linking agent constituents are added a whitening agent such as titanium dioxide to give the marker lustrous white coloring. The premix composition also contains a small percentage by weight of thickener which is a colloidal form of silica such as $SiO_2$ which has the effect of maintaining the $TiO_2$ uniformly dispersed so that there is no settling of those constituents.

Those skilled in the art will recognize that proportions of the above components may be determined easily depending upon the properties and characteristics which markers are to possess. It will also be understood that the premix composition may be made up in large batches since it is stable over a considerable period of time.

The final mix composition is not made up until just before it is to be used. A quantity of premix is removed from the main batch. To such premix is added a catalyst which in the case of a main base mixture of polyester resin would be methyl ethyl ketone peroxide and hydroperoxides in dimethyl phthalate. Of course the use of other catalysts is not excluded. Besides the catalyst, there is added an accelerator such as cobaltous naphthenate. Finally, the glass beads are added.

The small spherical glass particles or beads may fall within the range of from about .147 to 3 millimeters and preferably within the range of .147 to .833 millimeter in diameter.

Beads larger than the preferred range have several disadvantages connected therewith. Wear on the marker is faster because dislodged beads leave larger voids without exposing beads deeper within the marker. Thus, the marker loses reflectance properties.

The complete, or final composition is mixed together thoroughly in an appropriate beating machine and transferred to a dispensing mechanism. All mixing operations should be conducted so as to keep air entrainment to an absolute minimum.

(A) Referring now to FIG. 1, illustration A, it will be seen that markers may be of any desired configuration, although for purposes of discussing this invention they have been shown to be cookie shaped or flat on one side and convex on the opposite side. A mold pan as used in this process may carry a plurality of individual marker molds. The individual molds are smooth and formed of metal or other material suitable for molding plastic. The illustrations of FIG. 1 are represented in cross section for no other purpose than to facilitate description and understanding of this process.

The mold pans are mounted on a continuous conveyor mechanism which moves through a curing oven. As the mold moves toward the entrance end of the oven a porous cloth material is laid over the mold pan thereby covering each individual marker mold. It has been found that the porous material which functions best is a double layer of unbleached cheesecloth with a 28×24 thread count.

(B) It has been found essential to press the cheesecloth to the bottom of the mold depression since the mix when added, even though it is very viscous, does not do so. Thus, a hand tool, or other means which assumes the shape of a marker mold may be used to press the cheesecloth downwardly against the bottom of the marker mold surface. It also is important that the cheesecloth, when pressed into the individual marker molds be free of wrinkles. If there are wrinkles in the cloth the marker will cure with a line or groove in the convex or reflecting surface and said marker will be imperfect.

(C) After the cheesecloth has been placed on and pressed into the individual marker molds, the mix is added. As mentioned above, it is imperative to keep air entrainment to a minimum. Air bubbles, especially if they are at all large, weaken the markers physically and furthermore introduce objectionable voids on the convex or reflecting surface. Preferably, of course, the apparatus for dispensing the mix into the molds is such that despite the number of individual marker molds which a single mold pan may contain all of such marker molds may be filled simultaneously. The mix itself should be fluid enough to be self-levelling, since the flat surface must be free within certain tolerances of either concavity or convexity. In order to minimize air entrainment and splash the pouring spouts or barrels of the dispensing apparatus should be supported quite close to the mold pan. After the mix is injected into the molds the conveyor carries said molds into the curing oven.

(D) Exposure of the markers to the curing oven is a closely regulated step in this process. The oven step has as a principal purpose to partially cure the markers so that they emerge from the oven while rubbery yet hard enough to retain their shape. It is important in this partial curing step that the markers receive uniform heating both top and bottom. The precise details of the oven are not essential to an understanding of this invention. Those skilled in the art can determine, empirically or otherwise, what temperature should be applied and for what length of time. A curing temperature of about 150° F. with a time of from about 9 to 13 minutes has been employed quite successfully. It is desired to avoid defining time and temperature within any specific limits since these values will vary depending upon the quantitative analysis of the composition itself and the extent of partial cure needed.

(E) When the partially cured or hardened markers emerge from the oven they should have a rubbery consistency. They should not be so soft that they lose shape. Nor should they be so hard that the cheesecloth cannot be stripped off. Obviously, this particular stage in the process represents an important step in conjunction with the use of the cheesecloth.

(F) Immediately upon emerging from the oven in its partially cured state the marker and its accompanying strip of cheesecloth is removed from the mold. It has been found, with respect to the molds themselves, that a mold release agent need be applied to the molds only once in each half day of operation. Normally, the markers and cloth will slip out of the molds with very little urging.

(G) When the marker has been removed from its mold the cheesecloth is peeled off. When the mix is poured into the mold it will be understood that the resin base envelopes the beads and flows through the cheesecloth and against the mold surface. Thus, when the marker is removed, it has a smooth convex surface as well as a substantially smooth flat or bottom surface. The cheesecloth in being stripped off takes with it a thin layer of bead impregnated marker body. The effect of this stripping step is to leave a rough reflecting surface on which a maximum amount of partially embedded bead aggregate (see FIG. 2) is exposed. Thus the thin layer of marker body which the stripping step removes leaves the outside of the cheesecloth smooth and the inside rough like the surface of the marker itself. Stripping the markers may be accomplished as rapidly as a worker is able to remove the markers from the molds.

Prior to the discovery of this method for producing beaded markers mechanical stripping or abrading was employed. Such process required time and additional equipment. The mechanical method involved a loss of marker weight of up to 15%. The present method has been demonstrated to involve a weight loss of 3.5 to 4.3% of the marker. The obvious advantage of eliminating and abrading step and the time consumed therein was also a great step forward in this art.

(H) After stripping off the cheesecloth the markers are placed bottom side down on metal sheets or pans for final curing. Such final curing involves using the exothermic reaction in which the polymerizing of the resin base has been instituted by catalyst and accelerator. The resulting temperature provides the complete cure without need for externally applied heat. The exotherm or specific heat of reaction increases the temperature of the marker to about 250–260° F. The peak temperature is reached in 15 to 20 minutes after removal from the partial curing oven. The peak is held for perhaps 5 to 10 minutes and then begins to cool. Cooling requires about an hour after which time the markers are completely hardened. The markers may then be packaged or otherwise stored without fear of their losing shape.

Operation of this process may be illustrated by the following examples.

*Example I*

| Constituents: | Percent by weight of mix |
|---|---|
| Premix— | |
| (1) Polyester resin | 38.05 |
| (2) Styrene monomer | 4.23 |
| (3) TiO$_2$ | 21.10 |
| (4) Colloidal silica (adjustable for settling) | .33 |
| Final Mix— | |
| (5) Catalyst (methyl ethyl ketone peroxide) (adjustable for curing and hardening) | 1.24 |
| (6) Accelerator (cobalt naphthenate) (adjustable for curing and hardening) | .23 |
| (7) Spherical glass particles (.147–.833 mm. dia.) | 34.82 |
| Total | 100.00 |

The above composition was placed in molds lined with a double layer of unbleached cheesecloth having a 28×24 thread count. The markers were then subjected to a partial cure oven temperature at 150° F. for a period of 11½ minutes and then removed, peeled and placed on trays for final curing. Such example results in a commercially acceptable road marker having high body strength and excellent reflecting properties.

*Example II*

| Constituents | Parts by Weight (gms.) | Percent by Weight |
|---|---|---|
| Epoxy resin | 100 | 35.43 |
| Catalyst (DMP-30) | 6 | 2.15 |
| Pigment (TiO$_2$) | 25 | 8.87 |
| Glass beads | 150 | 53.20 |
| Colloidal silica | 1 | .35 |
| Totals | 282 | 100.00 |

In this example the epoxy resin is a reaction product of bis-phenol A and epichlorohydrin such as Emlon E–22 or Shell Chemical Company's Epon 828. The catalyst used is tris (dimethylaminomethyl) phenol. The glass beads are typified in both examples by H–85WP glass beads made by Cataphote Corporation.

In this example an epoxy resin with a well-known amine catalyst was employed and found to produce an excellent marker.

In both examples the colloidal silica is typified by the product known as Cab-O-Sil, produced by Godfrey L. Cabot, Inc., of Boston, Massachusetts.

When the completed markers are attached to a road surface they retain their high reflectivity by virtue of being washed occasionally with rain and by the constant passage of traffic thereover. As the marker wears and some of the spheres are dislodged, new spheres from the body of the marker are exposed, thus permitting the marker to maintain its light-reflecting properties.

The foregoing is considered as illustrative only of the principle of this invention. Since numerous modifications and changes will readily occur to those skilled in the art, it is not desired to limit the invention to the exact process shown and described, and accordingly all suitable modifications and equivalents may be resorted to, falling within the scope of the invention.

What is claimed is:

1. The process of producing reflective road markers, comprising: (1) lining a mold of the desired road marker configuration with porous cloth, (2) filling said mold with a hardenable plastic composition containing glass beads, (3) partially curing said composition, (4) removing the marker from said mold while it is not yet fully hardened, (5) stripping the porous cloth from said marker to expose a reflecting surface, and (6) finally curing said marker.

2. The process of producing road markers, comprising (1) lining a mold of the desired road marker configuration with porous cloth, (2) filling said mold with a viscous hardenable mixture comprising the road marker composition and glass beads, (3) partially curing said mixture in an oven at a predetermined temperature and for a predetermined time, (4) removing the markers from said mold while they are not yet fully hardened, (5) stripping the porous cloth from said markers to expose a reflecting surface, and (6) allowing said markers to finally harden by their specific heat of reaction.

3. The process of producing road markers, comprising: (1) lining a mold of the desired road marker configuration with porous cloth; (2) filling said mold with a viscous hardenable road marker composition consisting of, (a) polyester resin and styrene monomer, (b) whitening agent, (c) thickener, (d) catalyst, (e) accelerator, and (f) small glass beads; (3) partially curing said mixture in an oven at a predetermined temperature and for a predetermined time; (4) removing the markers from said mold while they are not yet fully hardened; (5) stripping the porous cloth from said marker to expose a highly reflective surface of glass beads partially embedded in said marker; and (6) finally curing said marker.

4. The process of producing road markers, comprising: (1) lining a mold of the desired road marker configuration with porous cloth; (2) filling said mold with a viscous hardenable road marker composition containing a high percentage by weight of spherical glass particles of from about .147 to about 3.0 millimeters in diameter; (3) partially curing said composition in an oven at a predetermined temperature and for a predetermined time; (4) removing the marker from said mold while it is not yet fully hardened; (5) stripping the porous cloth from said marker to expose a reflective surface of spherical glass particles partially embedded in said partially cured composition; and (6) allowing said marker to finally cure and harden by its specific heat of reaction.

5. The process of producing road markers, comprising: (1) lining a mold of the desired road marker configuration with a double layer of cheese cloth having a 28×24 thread count; (2) filling said mold with a viscous hardenable road marker composition containing a high percentage by weight of spherical glass particles of from about .147 to about 0.833 millimeter in diameter; (3) partially curing said composition in an oven at a predetermined temperature and for a predetermined time; (4) removing the marker from said mold while it is not yet fully hardened; (5) stripping the cheese cloth from said marker to expose a reflective surface of spherical glass particles partially embedded in said partially cured composition; and (6) allowing said marker to finally cure and harden by its specific heat of reaction.

6. The process of producing road markers, comprising: (1) lining a mold of the desired road marker configuration with porous cloth; (2) filling said mold with a viscous, hardenable plastic composition consisting of (a) epoxy resin, (b) catalyst, (c) whitening agent, (d) thickener, (e) small glass beads; (3) partially curing said composition in an oven at a predetermined temperature and for a predetermined time; (4) removing the markers from said mold while they are not yet fully hardened; (5) stripping the porous cloth from said markers to expose a highly reflective surface of glass beads partially embedded in said markers; and (6) finally curing said markers.

References Cited in the file of this patent

UNITED STATES PATENTS

| | | |
|---|---|---|
| 2,076,846 | Johanson | Apr. 13, 1937 |
| 2,111,742 | Bloomenthal | Mar. 22, 1938 |
| 2,454,910 | Carr | Nov. 30, 1948 |
| 2,467,590 | Johnson | Apr. 19, 1949 |
| 2,897,733 | Shuger | Aug. 4, 1959 |

OTHER REFERENCES

Rooney et al.: "Traffic Line Markers," in California Highways and Public Works of May-June 1955; reprinted in December 1956 by Thiokol Chemical Corp., Trenton 7, N.J. (reprint consists of 3 pages).